United States Patent [19]

Reese

[11] 4,425,145

[45] Jan. 10, 1984

[54] MULTI-STAGE AIR FILTER

[75] Inventor: Paul T. Reese, New Holstein, Wis.

[73] Assignee: Tecumseh Products Company, Tecumseh, Mich.

[21] Appl. No.: 482,764

[22] Filed: Apr. 7, 1983

Related U.S. Application Data

[62] Division of Ser. No. 357,302, Mar. 11, 1982.

[51] Int. Cl.³ .............................................. B01D 50/00
[52] U.S. Cl. .................................. 55/385 B; 55/482; 55/497; 55/521; 55/522; 55/DIG. 13; 123/195 C
[58] Field of Search ...................... 55/385 B, 323, 482, 55/487, 521, 510, 497, 522, DIG. 13; 123/195 C

[56] References Cited

U.S. PATENT DOCUMENTS

| | | |
|---|---|---|
| 2,785,767 | 3/1957 | Glidden . |
| 3,442,067 | 5/1969 | Swenson ............................. 55/482 |
| 3,710,562 | 1/1973 | McKenzie . |
| 3,744,216 | 7/1973 | Halloran . |
| 3,745,753 | 7/1973 | Risse . |
| 3,791,105 | 2/1974 | Rhodes . |
| 4,023,472 | 5/1977 | Grunder et al. . |
| 4,104,170 | 8/1978 | Nedza . |
| 4,129,426 | 12/1978 | Furasen . |
| 4,233,043 | 11/1980 | Catterson . |
| 4,259,097 | 3/1981 | Ratel et al. . |
| 4,265,647 | 5/1981 | Donachiue . |

FOREIGN PATENT DOCUMENTS 907236 10/1962 United Kingdom .................. 55/510

Primary Examiner—Bernard Nozick
Attorney, Agent, or Firm—Albert L. Jeffers; Douglas L. Miller

[57] ABSTRACT

The invention provides an air cleaner assembly in combination with an engine having a blower housing with airflow circulating therethrough and a carburetor having an intake. The assembly comprises a duct having an inlet and an outlet with the inlet angularly disposed through the blower housing, an air cleaner housing having side walls and a bottom wall, and an outlet chamber having an inlet and an outlet in communication with the carburetor inlet. Within the air cleaner housing, a first interior wall is upstanding from the bottom wall and defines with certain side walls an intake chamber having an inlet communicating with the duct outlet, and a second interior wall upstanding from the bottom wall so that a filter chamber is formed between the interior walls having an outlet in its bottom wall so that the filter chamber and outlet chamber communicate through the filter chamber outlet and the outlet chamber inlet. The second interior wall and other side walls of the housing define a passageway in communication with the outlet chamber and the engine crankcase. Removably placed within the filter chamber is a filtering element, and removably attached to the air cleaner housing is a cover having side walls and a top wall such that the top wall is spaced above the filtering element to form therebetween a passageway, which provides communication between the intake chamber, filter chamber and passageway.

8 Claims, 14 Drawing Figures

U.S. Patent Jan. 10, 1984 Sheet 1 of 4 4,425,145
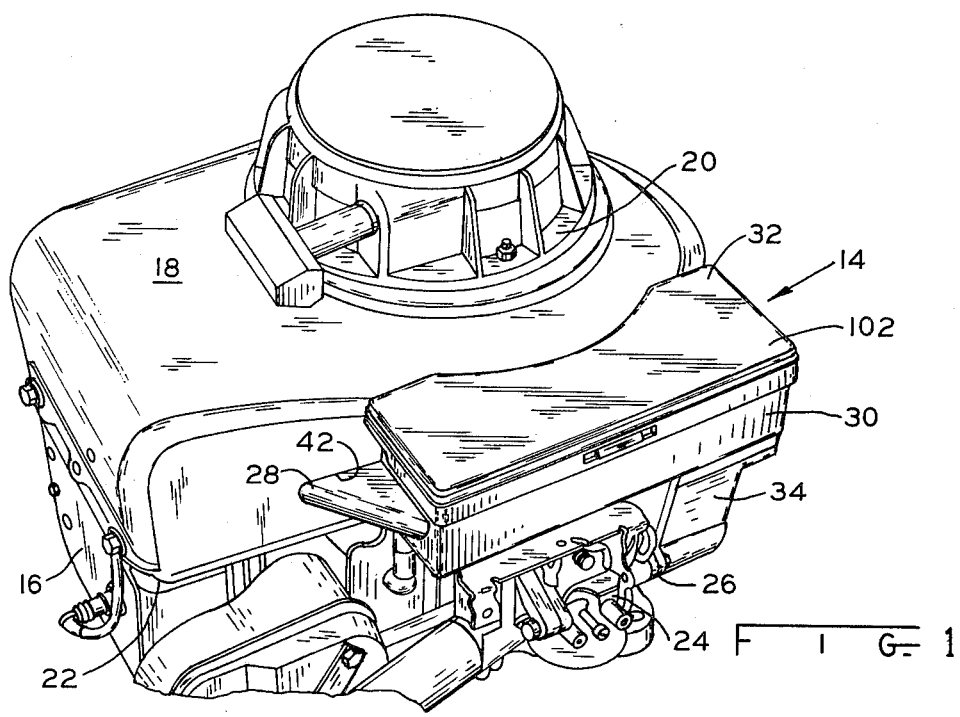
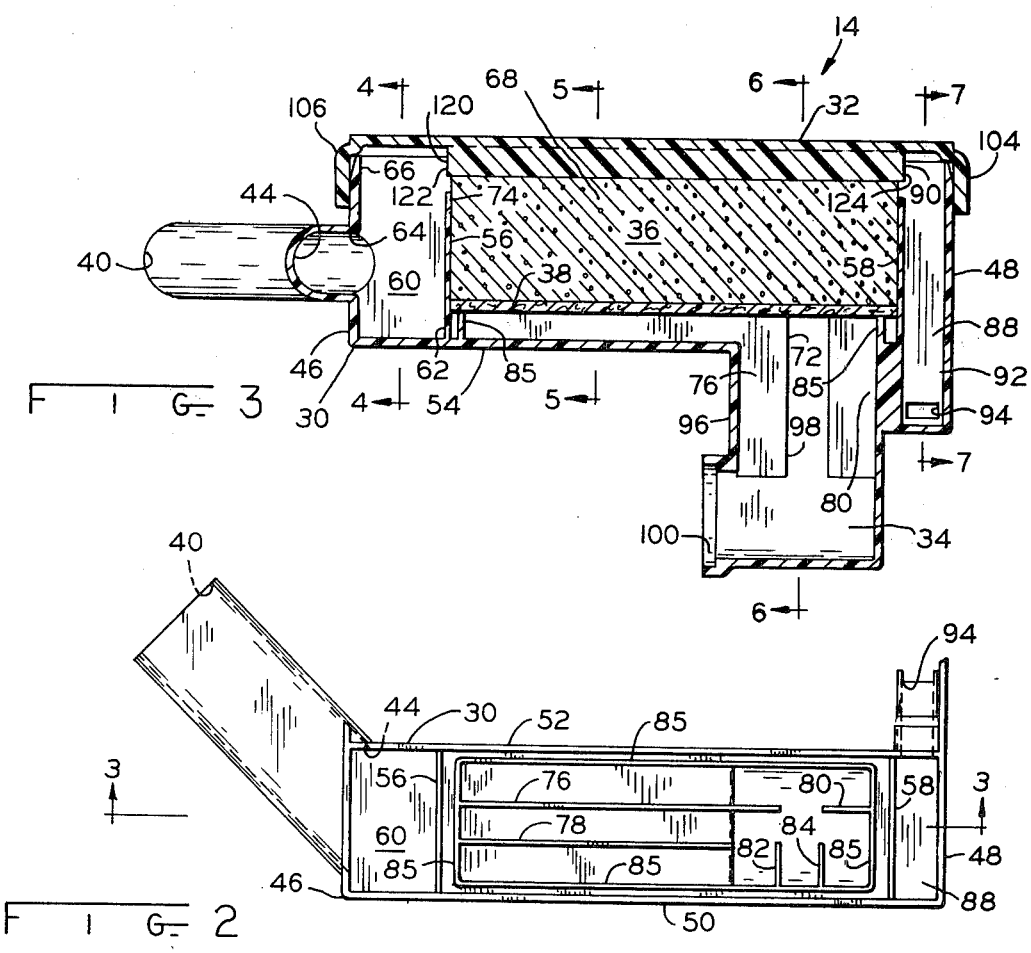

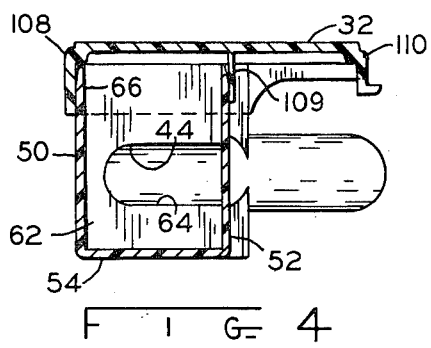
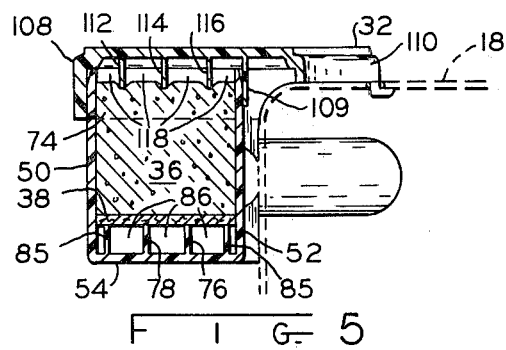
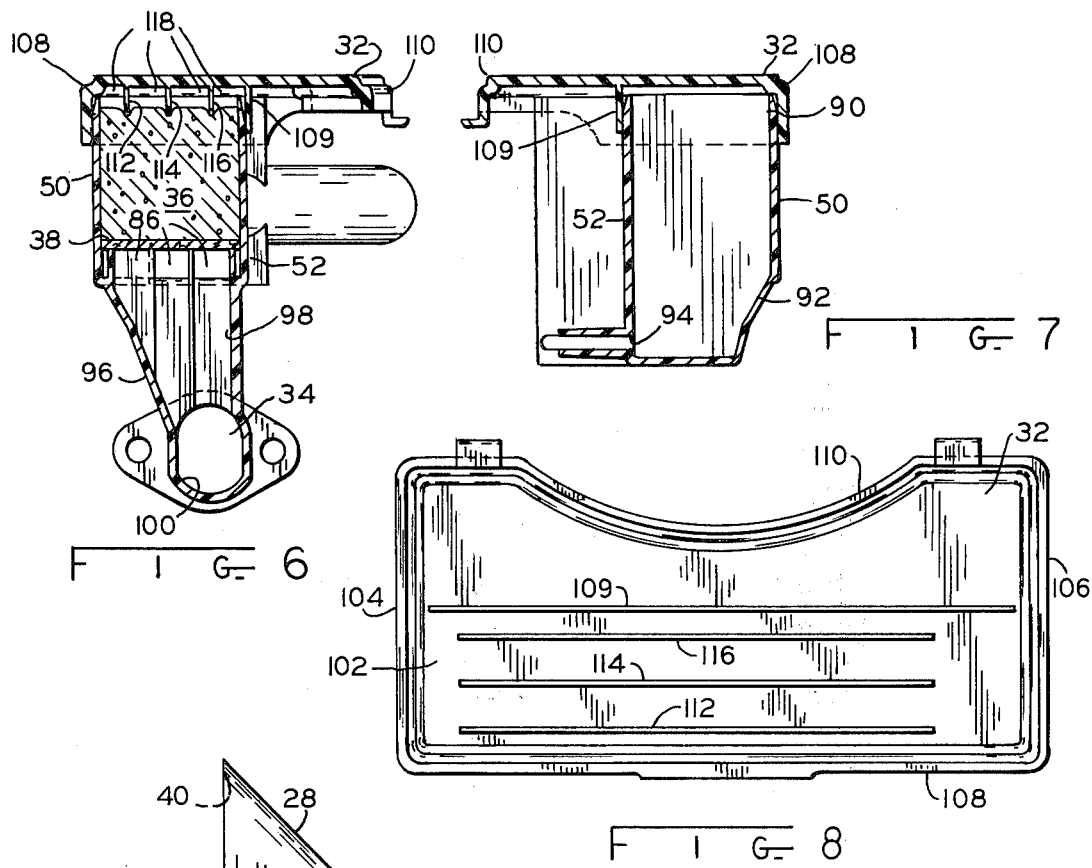

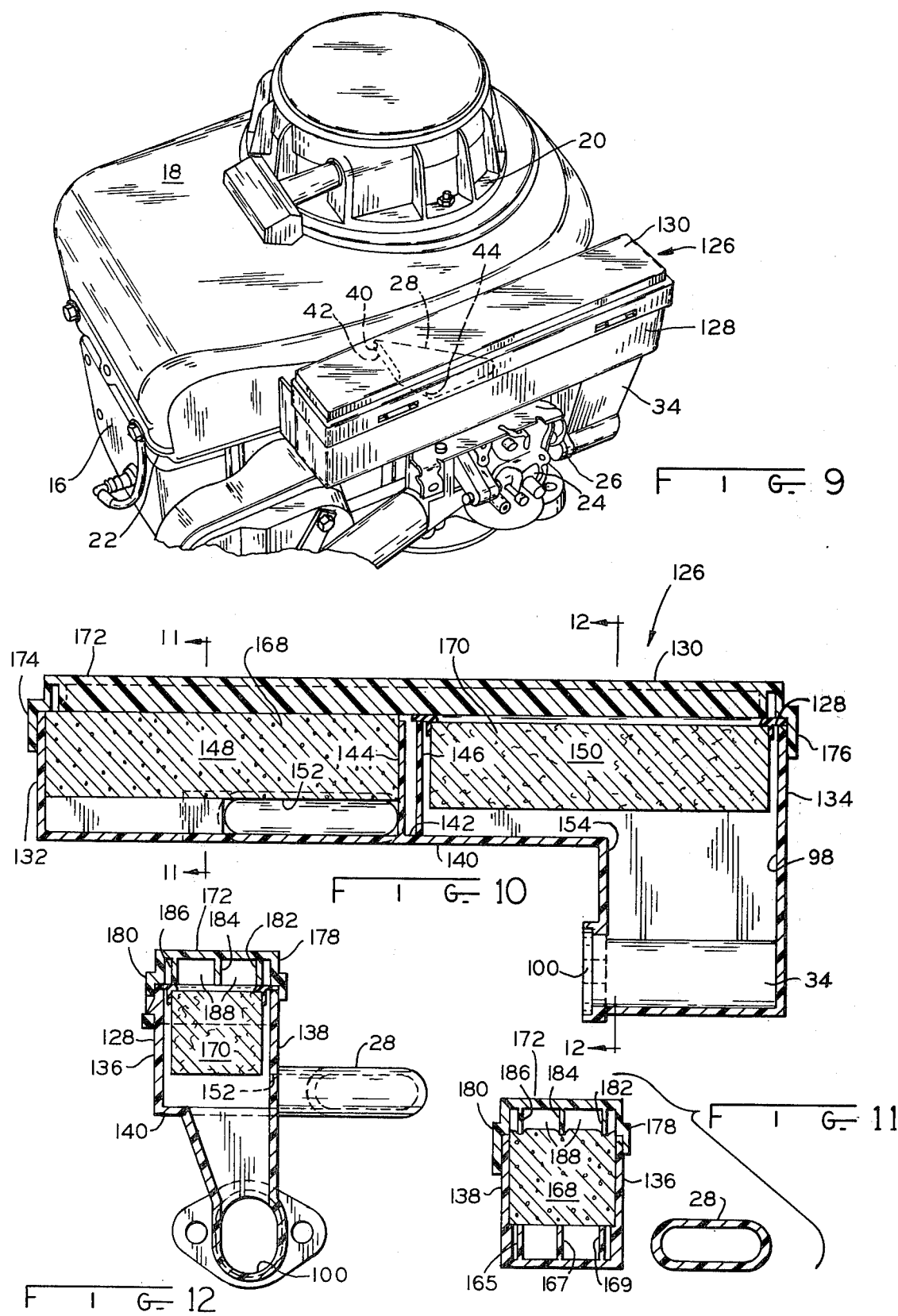

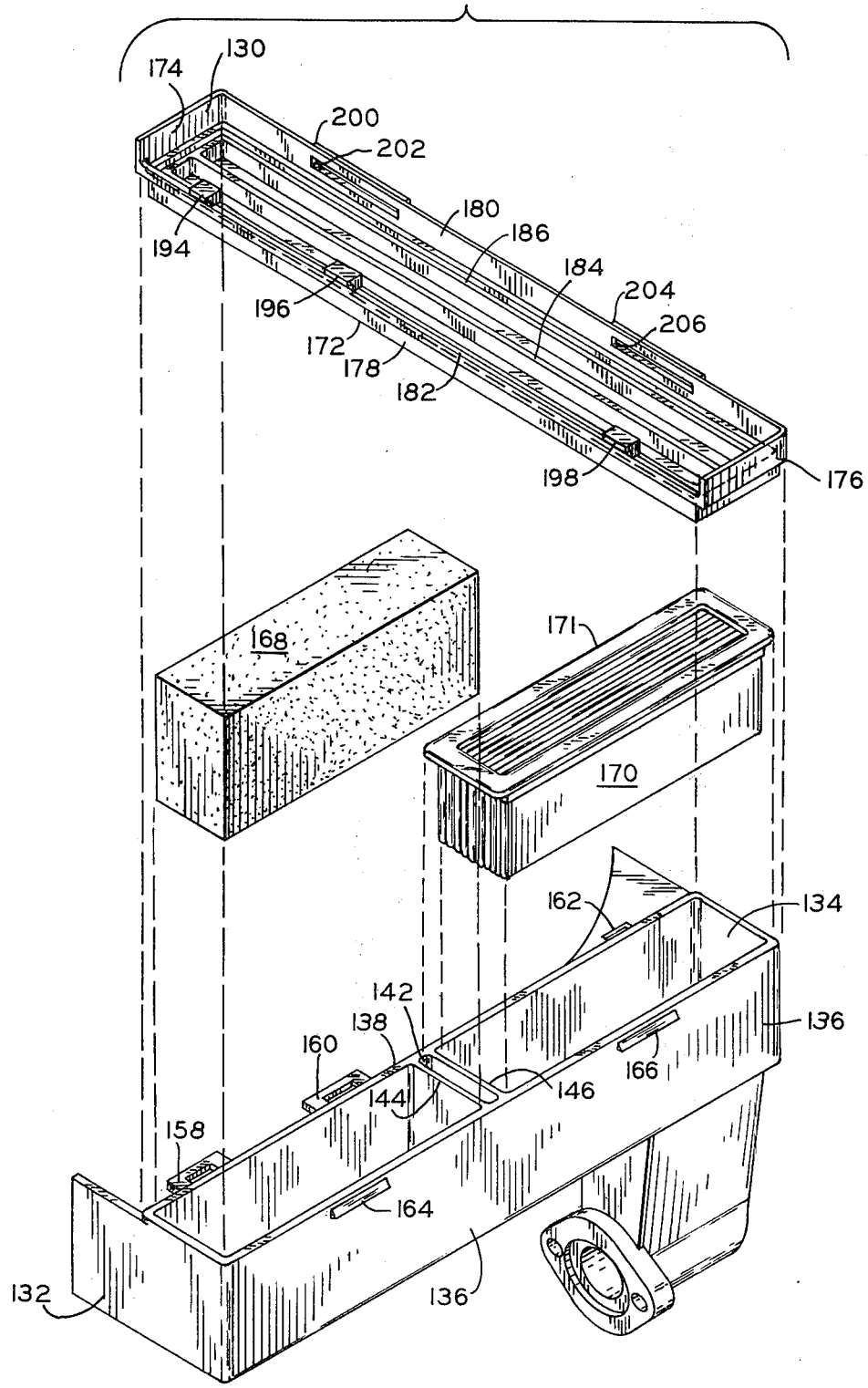

MULTI-STAGE AIR FILTER

This is a division of application Ser. No. 357,302, filed Mar. 11, 1982.

BACKGROUND OF THE INVENTION

1. Field of the Invention

This invention pertains to an air cleaner, and more particularly to an air cleaner assembly adapted to an engine for filtering air prior to combustion.

2. Description of the Prior Art

The filtering of air prior to combustion is necessary to maintain the operational life of the engine for a satisfactory period. Two of the more common methods used in conjunction to filter the air are subjecting the airflow to abrupt changes in direction which utilizes the forward inertia of the larger particles to remove them from the continuing path of the airflow, and filtering the airflow through one or two filter media of different materials.

For example, in numerous engines for lawnmowers, the air for combustion is withdrawn from the blower housing by a conduit or duct leading to the air cleaner housing. Generally, only this conduit or duct provides an exhaust to the outside atmosphere for the heavier particles which are separated by their forward inertia during the abrupt change of the airflow from the conduit or duct to the air cleaner housing. Once the airflow has entered the air cleaner housing, other heavier particles are likewise removed by abrupt changes in direction of the airflow, however, these other heavier particles are maintained internally within the air cleaner housing and eventually, upon an accumulating build up in the filter, will be released into the engine. Once this point is reached, the engine will begin to wear due to the abrasive effects of the particles therein.

A second disadvantage of prior art air cleaners is the problem of removing and replacing the filters without permitting foreign particles to fall through the carburetor inlet into the carburetor. Most prior art air cleaners do not provide a way for removing and replacing the filters without allowing a certain amount of foreign particles from entering the carburetor. The accumulating affects of this problem generally results in the requirement to rebuild or replace the engine at the expense of the user.

SUMMARY OF THE INVENTION

The problems and disadvantages described above are substantially eliminated by the present invention which provides an improved air cleaner assembly adaptable to a combustion engine, for example, the combustion engine of a lawnmower. Specifically, one embodiment of the present invention provides a second filter, made of felt, for example, immediately downstream of a first filter, made of a polyurethane foam, to prevent particles from entering the engine when the first filter releases the particles due to an accumulating effect therein.

A modification of the above embodiment of the present invention provides an additional step in the filtering process. The modification comprises removing the two filters from the filter compartment and placing them in individual compartments within the air cleaner housing. In this embodiment, the intake chamber becomes a filter chamber for a foam filter, and the other chamber becomes a filter chamber for a paper filter, both chambers being in communication by an air passageway. The airflow exiting the duct is redirected upwardly through the foam filter chamber, then directed generally horizontally by the passageway, and thereafter redirected generally downwardly through the second chamber containing the paper filter.

Another feature of the above embodiment of the present invention improving upon the prior art devices is the presence of a flange peripherally disposed along the top portion of the paper filter within the second chamber having an outlet in the bottom communicating with the carburetor. The flange generally serves three basic purposes. Firstly, the flange acts as a retainer of the paper filter within the filter chamber. Secondly, the flange acts as a seal between the outer sides of the paper filter and the inner sides of the filter chamber to prevent particles from passing therebetween. Thirdly, the flange allows easy removal of the paper filter for replacement, while simultaneously preventing dust particles from falling into the filter chamber between the outer surfaces of the filter and the inner surfaces of the filter chamber during removal. The flange, therefore, also serves to increase the useful longevity of the engine.

Stated broadly, the invention provides an air cleaner assembly in combination with an engine including a blower housing having airflow circulating therethrough and a carburetor having an intake. The assembly comprises a duct having an inlet and an outlet with the inlet being angularly disposed through the blower housing; an air cleaner housing having side walls, a bottom wall, a first interior wall upstanding from the bottom wall and defining with the side walls an intake chamber having an inlet and communicating with the duct outlet, a second interior wall upstanding from the bottom wall such that a filter chamber is formed between the interior walls having an outlet in its bottom wall, and the second interior wall and other side walls of the housing defining a passageway having an outlet connected to the engine crankcase; an outlet chamber having an inlet and an outlet and being in communication with the filter chamber through the filter chamber outlet and the outlet chamber inlet, the outlet chamber outlet being in communication with the carburetor inlet; a filtering element removably placed within the filter chamber; and a cover having side walls and a top wall, and being removably attached to the air cleaner housing so that the top wall is spaced above the filter element to form therebetween a passageway providing communication between the intake chamber, the filter chamber, and the passageway.

It is an object of the present invention to provide an improved air cleaner assembly which prevents particles from entering the engine upon being released by a clogged filter.

Another object of the present invention is to provide an air cleaner assembly having an air cleaner housing containing two filter elements in two chambers within the housing, the filter element prior to carburetor entry having a flange peripherally disposed along its top portion for retaining the filter in the chamber, sealing the filter chamber against dust particles falling between the outer surfaces of the filter and the inner surfaces of the chamber, and permitting the removal of the filter for replacement purposes without allowing foreign particles to enter the chamber during the removal process.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a perspective view of an air cleaner assembly of the present invention connected to a combustion engine;

FIG. 2 is a top plan view of a preferred embodiment of the present invention without the cover thereon;

FIG. 3 is a sectional view of FIG. 2 taken along line 3—3 and viewed in the direction of the arrows;

FIG. 4 is a sectional view of FIG. 3 taken along line 4—4 and viewed in the direction of the arrows;

FIG. 5 is a sectional view of FIG. 3 taken along line 5—5 and viewed in the direction of the arrows;

FIG. 6 is a sectional view of FIG. 3 taken along line 6—6 and viewed in the direction of the arrows;

FIG. 7 is a sectional view of FIG. 3 taken along line 7—7 and viewed in the direction of the arrows;

FIG. 8 is a bottom plan view of a cover of a preferred embodiment of the present invention;

FIG. 9 is a perspective view of an alternate embodiment of the present invention connected to a combustion engine;

FIG. 10 is a sectional view of an alternate embodiment of the present invention;

FIG. 11 is a sectional view of FIG. 10 taken along line 11—11 and viewed in the direction of the arrows;

FIG. 12 is a sectional view of FIG. 10 taken along line 12—12 and viewed in the direction of the arrows;

FIG. 13 is an exploded view of an alternate embodiment of the present invention; and FIG. 14 is a top plan view of an alternate embodiment of the present invention without the cover thereon.

DETAILED DESCRIPTION

Referring to FIGS. 1-8, a preferred embodiment of the present invention is illustrated. FIG. 1 shows an air cleaner assembly 14 of the present invention installed on a conventional combustion engine 16, typically used with a lawnmower, and which has a blower housing 18, blower housing intake 20, blower housing exhaust 22, carburetor 24, and carburetor inlet 26. Air cleaner assembly 14 further comprises duct 28, housing 30, cover 32, outlet chamber 34, filter element 36, and filter element 38.

Referring now in more detail to FIGS. 1-8, duct 28 has inlet 40 and outlet 44, and is angularly disposed through blower housing opening 42 at an angle of approximately 135° to the flow of the circulating air within blower housing 18. The function of the angular placement of duct 28 through blower housing 18 is to allow air flow through duct 18, while preventing the entry of foreign particles. Because of the centrifugal flow of air within blower housing 18 and the angular placement of duct 28 in relation thereto, larger foreign particles are unable to enter duct 28 due to their forward inertia created by the airflow.

Housing 30 comprises opposite and parallel side walls 46, 48, and opposite and parallel side walls 50, 52, bottom wall 54, interior wall 56, and interior wall 58. An intake chamber 60 is partially defined by interior wall 56, side walls 46, 50, 52, and bottom wall 54, and has a bottom portion 62 with an inlet 64 disposed through side wall 46 and a top portion 66.

A filter compartment 68 adjacent intake chamber 60 is defined between interior wall 56, interior wall 58, side wall 50, side wall 52, and bottom wall 54. Upstanding from bottom wall 54 of filter compartment 68 are baffles 76, 78, 80, 82, 84, 85, which provide supports for filter elements 36, 38, thereby forming passageways 86 for the air exiting filters 36, 38.

Adjacent filter compartment 68 and on the side opposite intake chamber 60 is passageway 88 defined by interior wall 58, side walls 48, 50, 52, and bottom wall 54, and which has a top portion 90 and a bottom portion 92 with an opening 94 for receiving crankcase gases and directing the gases with combustion air into engine 16.

Referring mainly to FIGS. 3 and 6, outlet chamber 34 is depicted and comprises a continuous side wall 96, inlet 98, and outlet 100, which is connected to carburetor inlet 26 in any conventional manner.

In this preferred embodiment, duct 28, housing 30, and outlet chamber 34 are all constructed and connected together by molding them as one unit. This facilitates not only the construction of air cleaner assembly 14, but also makes easier the installation of air cleaner assembly 14 to combustion engine 16. After construction in this preferred manner, filter elements 36, 38 are then removably positioned within filter compartment 68. Filter element 38 is initially placed within filter compartment 68 and supported by baffles 76, 78, 80, 82, 84, 85 and is preferably made of a thin layer of felt material applied to a porous plastic substrate to impart structural rigidity. Baffle 85 is continuous and thus serves to seal filter 38 close to its edges, thereby preventing dust or other particles from bypassing filter 38 and entering engine 16. Alternately, filter element 38 may be made of any suitable and conventional paper filter. Filter element 36 is thereafter placed within filter compartment 68 upon filter element 38. Filter element 36 is made of a polyurethane foam material which is impregnated with oil and which has a porousness of approximately 60 pores per square inch. Again, filter element 36 may be made of alternate foam-type materials and equivalents thereof. The relative thicknesses of filter element 36 and filter element 38 are substantially represented by FIG. 3, wherein filter element 38 is between 1/16-⅛ inch in thickness and filter element 36 is between 1-2 inches in thickness. Using two filter elements increases the filtering capacity of the air cleaner assembly 14, with the foam filter element 36 providing in-depth filtering and the felt filter element 36 providing surface filtering of the airflow passing therethrough. The use of felt as the filter element 38 proved particularly effective in filtering the air and increasing the running time of the combustion engine 16 during tests. For example, tests were run in a controlled, polluted atmosphere using only filter element 36, and then using both filter elements 36, 38. In those tests utilizing only the foam filter element 36, the combustion engine operated satisfactorily on an average of two hours, while in those tests utilizing both the foam filter element 36 and the felt filter element 38 the combustion engine 16 continued to run satisfactorily on an average of four hours. In the test utilizing only filter element 36, filter element 36 becomes saturated with particles within about two hours and thereafter fed those particles into engine 16. However, when both filter elements 36, 38 were used, filter element 38 absorbed the particles passing through filter element 36. When filter element 38 became saturated with particles, the resulting pressure drop developed shut down engine 16.

Referring now to FIGS. 3, 4, 5, 6, 7 and 8, cover 32 for housing 30 is illustrated. Cover 32 has a top wall 102 and side walls 104, 106, 108, 109, 110. The inside dimensions of cover 32 defined by walls 104, 106, 108, 109 are just slightly larger than the outside dimensions of housing 30 so that cover 32 may be removably secured to housing 30. Cover 32 further has extending downwardly from top wall 102 baffles 112, 114, 116 which run the length of cover 32, and, upon placement of cover 32 on housing 30, baffles 112, 114, 116, top wall 102, and the upper surface of filter element 36 form air passageways 118 therebetween. Air passageways 118 then define outlet 120 in top portion 66 of intake chamber 60, inlet 122 in top portion 74 of filter compartment 68, and inlet 124 in top portion 90 of passageway 88, so that intake chamber 60, filter compartment 68, and passageway 88 are in communication with each other through air passageways 118. Baffles 112, 114, 116, in addition to defining air passageways 118, which are longitudinally oriented with respect to cover 32 so as to permit airflow thereunder, also press slightly downwardly upon the upper surface of filter element 36 so as to prevent filter element 36 from rising upwardly against cover top wall 102.

Air cleaner assembly 14, as described above and as shown installed on combustion engine 16 in FIG. 1, provides exceptional filtering of blower housing airflow prior to entry into carburetor inlet 26. The airflow passing through filter compartment 68 undergoes in-depth filtering by the foam filter element 36 and subsequent surface filtering by the felt filter element 38. Upon exiting filter element 38, the airflow is then directed through outlet 72 of filter compartment 68 and inlet 98 of outlet chamber 34 for passage through carburetor inlet 26 and into carburetor 24 for combustion.

Air cleaner assembly 14 may be easily cleaned by removing cover 32 and cleaning the bottom portion of intake chamber 60 of any foreign particles. Foam filter element 36 is cleaned by removing and washing with ordinary soapy water, and then impregnating foam filter element 36 with oil such as SAE 30, removing the excess oil, and then replacing the foam filter element 36 within filter compartment 68. Timely servicing of filter element 36 prevents particles from reaching filter element 38, which, if left in place, prevents particles from falling into outlet chamber 34.

Referring now to FIGS. 9-13, an alternate embodiment of the present invention is depicted, and, where elements of the alternate embodiment are similar to elements of the preferred embodiment, identical reference numerals have been used. Air cleaner assembly 126 of the alternate embodiment of the present invention is similar to air cleaner assembly 14 in that air cleaner assembly 126 has a similar duct 28 with inlet 40 and outlet 44, and which is angularly disposed through blower housing 18 at opening 42 at approximately 135° to the path of the airflow within blower housing 18. Additionally, air cleaner assembly 126 and air cleaner assembly 14 have a common outlet chamber 34 with inlet 98 and outlet 100 connected to carburetor inlet 26. The dissimilarities between air cleaner assembly 126 and air cleaner assembly 14 exist in housing 128 and cover 130 of air cleaner assembly 126.

Referring now to FIGS. 10-14, housing 128 comprises opposite and parallel side walls 132, 134, opposite and parallel side walls 136, 138, and bottom wall 140. The inside of housing 128 is divided by an interior partition 142 made up of two adjacent walls 144, 146, which provide structural integrity to housing 128. Partition 142 forms within housing 128 filter chamber 148 defined by wall 144, side walls 132, 136, 138, and bottom wall 140, and has disposed through wall 138 an inlet 152 through which filter chamber 148 communicates with duct 28. Filter chamber 150 is defined by wall 146, side walls 134, 136, 138, and bottom wall 140, and has disposed through bottom wall 140 an outlet 154 through which filter chamber 150 communicates with outlet chamber 34.

Housing 128 has three slotted hinges 158, 160, 162 disposed along the top edge of side wall 138, and two lugs 164, 166 disposed along the top edge of side wall 136, the purposes of which will be explained hereinafter.

Removably fit within filter chamber 148 is a filter element 168 preferably made of polyurethane foam having a porousness of approximately sixty pores per square inch. Foam filter element 168 provides in-depth filtering of the airflow to remove foreign particles therefrom. Foam filter element 168 rests upon interrupted baffles 165, 167, 169, which upstand from bottom wall 140. Baffles 165, 167, 169 are interrupted so that incoming air flow through inlet 152 is provided access to bottom surface of foam filter element 168 for filtering purposes.

Filter chamber 150 has removably fit therein a filter element 170 preferably made of pleated paper material for surface filtering of foreign particles. Paper filter element 170 is retained within filter chamber 150 by a flange 171, which may be made of molded plastic or equivalents thereof, peripherally disposed along its top edge, and also serves to prevent foreign particles from falling into filter chamber 150 along the outside surfaces of paper filter 170. Flange 171 seals against the top edges of walls 134, 136, 138, 146 by the force applied against it by baffles 182, 184, 186, and sidewall 176 of cover 130.

Continuing to refer to FIGS. 9-14, cover 130 for housing 120 is illustrated, and has top wall 172, side walls 174, 176, 178, 180, baffles 182, 184, 186, which extend the length of cover 130 and form with top wall 172 and the top surfaces of filter elements 168, 170 air passageways 188.

Cover 130 further has disposed along the edge of sidewall 178 projections 194, 196, 198, and has disposed along the edge of sidewall 180 handle 200 with opening 202 and handle 204 with opening 206. These allow cover 130 to be easily installed on and removed from housing 128 by inserting projections 194, 196, 198 into slotted hinges 158, 160, 162, respectively, and then slipping handles 200, 204 over lugs 164, 166, respectively, so that lugs 164, 166 lock into opening 202, 206, respectively.

As described above, air cleaner assembly 126 is similar to air cleaner assembly 14 in that the former also provides within housing 128 changes in airflow direction of approximately 180° as the airflow exiting duct 28 is redirected upwardly by filter chamber 148, then redirected generally horizontally by air passageways 188, and thereafter again redirected downwardly by filter chamber 150 for further passage to outlet chamber 34 and carburetor inlet 26. Of particular import is the spatial relationship between paper filter element 170 and carburetor 24 wherein the airflow is directed downwardly into carburetor 24, thereby providing a more efficient and expeditious route for the air flow from filter chamber 150 to carburetor 24.

A further unique feature of air cleaner assembly 126 is flange 171 peripherally disposed along the top edge of paper filter element 170. In contrast to foam filter element 168, which is of sponge-type nature and therefore may be snuggly fit within filter chamber 148, paper filter element 170 does not have such elastic characteristics and, consequently, does not snugly fit within filter chamber 150. During removal and replacement of paper filter element 170, it is therefore possible for foreign particles to enter carbunetor inlet 26 through filter chamber 150 and outlet chamber 34 upon removal of paper filter element 170. To eliminate this possible clogging of engine 16, flange 171, which extends outwardly from the top edge of paper filter element 170, covers and protects the space between the outer surfaces of paper filter element 170 and the inner surface of filter chamber 150 against foreign particles falling therebetween during removal and replacement of paper filter element 170, as previously explained. Again this additional function of flange 171 also serves to extend the useful life of engine 16.

While this invention has been described as having a preferred and an alternate embodiment, it will be understood that it is capable of further modifications. This application is therefore intended to cover any variations, uses, or adaptation of the invention following the general principles thereof, and including such departures from the present disclosure as come within known or customary practice in the art to which this invention pertains and fall within limits of the appended claims.

What is claimed is:

1. In combination, an engine including a blower housing having circulating airflow therethrough, a carburetor having an inlet, and an air cleaner assembly, comprising:

a duct having an inlet and an outlet, said duct inlet being angularly disposed through said blower housing;

an air cleaner housing having side walls; a bottom wall; an interior wall upstanding from said bottom wall and dividing said air cleaner housing into two chambers, a first one of said chambers having an inlet in one of said side walls, said duct and said first chamber communicating through said duct outlet and said first chamber inlet, and a second one of said chambers having an outlet in its bottom wall;

an outlet chamber having an inlet and an outlet, said outlet chamber communicating with said second chamber through said outlet chamber inlet and said second chamber outlet, and said outlet chamber outlet communicating with said carburetor inlet;

a first means removably fitted within said first chamber for filtering airflow passing upwardly therethrough;

a second means removably fitted within said second chamber for filtering airflow passing downwardly therethrough; and a cover having side walls and a top wall, and being removably attached to said air cleaner housing, said top wall being spaced above said first and second filtering means and said interior wall thereby defining with said first and second filtering means a passageway providing communication between said first and second chambers, whereby airflow passes through said duct outlet and is directed upwardly by said first chamber, the airflow then being redirected generally horizontally by said passageway, and thereafter being redirected downwardly by said second chamber.

2. The assembly of claim 1 wherein said cover includes a baffle member extending downwardly from said top wall and preventing said first and second filtering means from moving upwardly into and blocking said passageway.

3. The assembly of claim 2 further including a plurality of spaced apart baffle members upstanding in a common plane from said first chamber bottom wall, said baffle members supporting said first filtering means thereon and providing at least one passageway defined therebetween for permitting air to flow through said inlet to said first filtering means.

4. The assembly of claim 3 wherein said duct inlet is angularly disposed through said blower housing approximately 135°.

5. The assembly of claim 4 wherein said first filtering means is a polyurethane foam filter.

6. The assembly of claim 5 wherein said second filtering means is a paper filter.

7. The assembly of claim 6 wherein said foam filter has a porousness of approximately sixty pores per square inch.

8. The assembly of claim 7 wherein said paper filter is pleated and is retained in said second chamber by a flange member peripherally disposed about its top portion, said flange member further sealing said second chamber from foreign particles and preventing their entry into said carburetor inlet.

* * * * *